US009792638B2

(12) United States Patent
Liu et al.

(10) Patent No.: US 9,792,638 B2
(45) Date of Patent: Oct. 17, 2017

(54) USING SILHOUETTE IMAGES TO REDUCE PRODUCT SELECTION ERROR IN AN E-COMMERCE ENVIRONMENT

(75) Inventors: Xiao Xiao Liu, Shanghai (CN); Erin Louise Gubser, Vallejo, CA (US); Elizabeth Dobbin, San Francisco, CA (US); Hema Budaraju, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 67 days.

(21) Appl. No.: 12/749,467

(22) Filed: Mar. 29, 2010

(65) Prior Publication Data

US 2011/0238536 A1 Sep. 29, 2011

(51) Int. Cl.
  *G06Q 30/00* (2012.01)
  *G06Q 30/06* (2012.01)
  *G06Q 30/02* (2012.01)

(52) U.S. Cl.
  CPC ......... *G06Q 30/0623* (2013.01); *G06Q 30/02* (2013.01); *G06Q 30/06* (2013.01); *G06Q 30/0601* (2013.01); *G06Q 30/0631* (2013.01); *G06Q 30/0641* (2013.01); *G06Q 30/0643* (2013.01)

(58) Field of Classification Search
  CPC ........ G06Q 30/02; G06Q 30/06; G06Q 50/01; G06Q 30/00; G06Q 30/0643; G06Q 30/0601; G06Q 30/0277; G06Q 30/0601; G06Q 30/0623; G06Q 30/0641; G06Q 30/0631
  USPC ................................................ 705/26.1, 27.1
  See application file for complete search history.

(56) References Cited

U.S. PATENT DOCUMENTS

| 5,852,823 | A | 12/1998 | De Bonet |
| 6,751,600 | B1 | 6/2004 | Wolin |
| 7,035,440 | B2 * | 4/2006 | Kaku ............................ 382/115 |
| 7,315,833 | B2 * | 1/2008 | Schrenk ............ G06F 17/30864 705/26.62 |
| 7,437,321 | B2 | 10/2008 | Hanechak |
| 7,657,126 | B2 * | 2/2010 | Gokturk et al. ............. 382/305 |
| 7,930,546 | B2 * | 4/2011 | Rhoads et al. ................ 713/176 |

(Continued)

FOREIGN PATENT DOCUMENTS

WO    WO-0111491 A1    2/2001

OTHER PUBLICATIONS

Dictionary.com, definition of "silhouette", http://dictionary.reference.com/browse/silhouette?s=t, pp. 1-2, accesed on Jul. 13, 2012.*

(Continued)

*Primary Examiner* — Anne Georgalas
(74) *Attorney, Agent, or Firm* — Schwegman Lundberg & Woessner P.A.

(57) ABSTRACT

Methods and systems for displaying, to a user interface, categories of items for the user to select from for querying the system, in order to enable the system to return to the user images of items of the style desired by the user for possible purchase. The categories of items can be presented to the user interface visually in silhouette form so that the user can select brand and the silhouette image of the style of item desired. Upon selection of the silhouette image, a query is sent to the system and images of the desired style of item are returned to the user interface for presentation to the user, along with certain attributes of the style of the item.

11 Claims, 23 Drawing Sheets

(56) References Cited

U.S. PATENT DOCUMENTS

| | | | |
|---|---|---|---|
| 8,121,902 B1* | 2/2012 | Desjardins | G06Q 30/0282 705/26.1 |
| 8,306,872 B2* | 11/2012 | Inoue et al. | 705/26.7 |
| 8,412,594 B2 | 4/2013 | Kundu | |
| 8,520,979 B2 | 8/2013 | Conwell et al. | |
| 8,719,075 B2 | 5/2014 | Macdonald Korth et al. | |
| 9,043,828 B1 | 5/2015 | Jing et al. | |
| 2007/0005571 A1* | 1/2007 | Brewer et al. | 707/3 |
| 2007/0168357 A1* | 7/2007 | Mo | G06Q 10/04 |
| 2007/0172155 A1 | 7/2007 | Guckenberger | |
| 2007/0257792 A1* | 11/2007 | Gold | G06Q 30/02 340/539.2 |
| 2008/0040671 A1 | 2/2008 | Reed | |
| 2008/0071553 A1 | 3/2008 | Hamadi et al. | |
| 2008/0109327 A1* | 5/2008 | Mayle | G06Q 30/0641 705/27.1 |
| 2008/0154488 A1* | 6/2008 | Silva | G01C 21/36 701/426 |
| 2009/0094260 A1* | 4/2009 | Cheng et al. | 707/100 |
| 2009/0150791 A1 | 6/2009 | Garcia et al. | |
| 2010/0036883 A1 | 2/2010 | Valencia-campo et al. | |
| 2010/0105370 A1 | 4/2010 | Kruzeniski et al. | |
| 2011/0161182 A1 | 6/2011 | Racco | |
| 2011/0238534 A1 | 9/2011 | Yakkala | |
| 2012/0054060 A1 | 3/2012 | Kundu | |
| 2013/0226743 A1 | 8/2013 | Kundu | |

OTHER PUBLICATIONS

"Japan's Amana Web Site Will Boast Graphi—Based Image Search," AsiaPulse News: NA, Asia Pulse Pty Ltd, (Dec. 15, 2006).*

"U.S. Appl. No. 12/749,458 , Response filed May 1, 2012 to Non Final Office Action dated Feb. 3, 2012", 22 pgs.

"U.S. Appl. No. 12/749,458, Non Final Office Action dated Feb. 3, 2012", 26 pgs.

"U.S. Appl. No. 13/011,510 , Response filed Jan. 9, 2012 to Non Final Office Action dated Mar. 11, 2011", 10 pgs.

"U.S. Appl. No. 13/011,510, Final Office Action dated Mar. 19, 2012", 13 pgs.

"U.S. Appl. No. 13/011,510, Non Final Office Action dated Oct. 11, 2011", 13 pgs.

"Shop It to Me: About Us", [Online]. Retrieved from the Internet: <URL: http://www.shopittome.com/about_us>, (Accessed Nov. 13, 2010), 2 pgs.

"U.S. Appl. No. 12/749,458, Non Final Office Action dated Jul. 20, 2012", 24 pgs.

"U.S. Appl. No. 13/011,510, Response filed Aug. 20, 2012 to Final Office Action dated Mar. 19, 2012", 13 pgs.

"U.S. Appl. No. 12/749,458 , Response filed Jun. 13, 2013 to Final Office Action dated Feb. 13, 2013", 13 pgs.

"U.S. Appl. No. 12/749,458, Advisory Action dated May 10, 2013", 3 pgs.

"U.S. Appl. No. 12/749,458, Examiner Interview Summary dated Jun. 20, 2013", 3 pgs.

"U.S. Appl. No. 12/749,458, Final Office Action dated Feb. 13, 2013", 26 pgs.

"U.S. Appl. No. 12/749,458, Response filed Apr. 15, 2013 to Final Office Action dated Feb. 13, 2013", 15 pgs.

"U.S. Appl. No. 12/749,458, Response filed Oct. 18, 2012 to Non Final Office Action dated Jul. 20, 2012", 19 pgs.

"U.S. Appl. No. 13/011,510, 312 Amendment filed Feb. 14, 2013", 7 pgs.

"U.S. Appl. No. 13/011,510, Notice of Allowance dated Nov. 15, 2012", 10 pgs.

"U.S. Appl. No. 13/011,510, PTO Response to Rule 312 Communication dated Mar. 5, 2013", 2 pgs.

"U.S. Appl. No. 13/852,879, Preliminary Amendment dated Jun. 26, 2013", 8 pgs.

"Silhouette", Dictionary.com, [Online]. Retrieved from Internet: <http://dictionary.reference.com/browse/silhouette?s=t>, (Jan. 24, 2013), 1-2 pgs.

"U.S. Appl. No. 12/749,458, Non Final Office Action dated Sep. 30, 2014", 40 pgs.

"U.S. Appl. No. 12/749,458, Response filed Dec. 30, 2014 to Non Final Office Action datled Sep. 30, 2014", 17 pgs.

"U.S. Appl. No. 12/749,458, Non Final Office Action dated Jan. 13, 2016", 13 pgs.

"U.S. Appl. No. 12/749,458, Advisory Action mailed Jul. 14, 2015", 4 pgs.

"U.S. Appl. No. 12/749,458, Final Office Action dated Apr. 8, 2015", 36 pgs.

"U.S. Appl. No. 12/749,458, Response filed Jun. 8, 2015 to Final Office Action dated Apr. 8, 2015", 25 pgs.

"U.S. Appl. No. 13/852,879, Non Final Office Action dated Nov. 10, 2016", 13 pgs.

"U.S. Appl. No. 13/852,879, Examiner Interview Summary dated Feb. 28, 2017", 3 pgs.

"U.S. Appl. No. 13/852,879, Corrected Notice of Allowance dated May 1, 2017", 8 pgs.

"U.S. Appl. No. 13/852,879, Notice of Allowance dated Apr. 18, 2017", 7 pgs.

"U.S. Appl. No. 13/852,879, Response filed Mar. 10, 2017 to Non Final Office Action dated Nov. 10, 2017", 17 pgs.

* cited by examiner

USING SILHOUETTE IMAGES TO REDUCE PRODUCT SELECTION ERROR IN AN E-COMMERCE ENVIRONMENT

TECHNICAL FIELD

The present disclosure generally relates to data processing techniques. More specifically, the present disclosure relates to methods and systems for displaying, to a user interface, item listings for the user to select from for querying the system, in order to enable the system to return to the user images of the type of item desired by the user for possible purchase.

BACKGROUND

Advancements in computer and networking technologies have enabled persons to conduct commercial and financial transactions "on-line" via computer-based applications. This has given rise to a new era of electronic commerce (often referred to as e-commerce.) A number of well-known retailers have expanded their presence and reach by operating websites that facilitate e-commerce. In addition, many new retailers, which operate exclusively online, have come into existence. The business models utilized by enterprises operating online are almost as varied as the products and services offered. For instance, some products and services are offered at fixed prices, while others are offered via various transaction methods, and still others are offered via a system of classified ad listings. Some enterprises specialize in the selling of a specific category of product (e.g., books) or a specific service (e.g., tax preparation), while others provide a myriad of categories of items and services from which to choose. Some enterprises serve only as an intermediary, connecting sellers and buyers, while others sell directly to consumers.

Despite the many technical advances that have improved the state of e-commerce, a great number of technical challenges and problems remain. One such problem involves determining how to best present products and services (e.g., items) that are being offered for sale, so as to maximize the likelihood that a transaction (e.g., the sale of a product or service) will occur. For instance, when a potential buyer performs a search for a product or service, it may often be the case that the number of item listings that satisfy the potential buyer's query far exceeds the number of item listings that can practically be presented on a search results page. Furthermore, when a buyer selects from a user interface an item of interest by textual name of that item, a selection error can occur. That is, the buyer might select the incorrect name of the product, such as selecting a clutch handbag when an evening handbag is really desired. Preventing that error and providing the buyer with an image of the precise type of item he or she is looking for enhances the buyer's experience and is more likely to lead to an executed transaction.

DESCRIPTION OF THE DRAWINGS

Some embodiments are illustrated by way of example and not limitation in the figures of the accompanying drawings, in which.

DETAILED DESCRIPTION

Methods and systems for displaying, at a user interface, item listings for the user to select from for querying the system, in order to enable the system to return to the user interface items of the type desired by the user for possible purchase is provided. In the following description, for purposes of explanation, numerous specific details are set forth in order to provide a thorough understanding of the various aspects of different embodiments of the present invention. It will be evident, however, to one skilled in the art, that the present invention may be practiced without these specific details.

Terminology

For the purposes of the present specification, the term "transaction" shall be taken to include any communications between two or more entities and shall be construed to include, but not be limited to commercial transactions including sale and purchase transactions, auctions and the like.

Transaction Facility

Figure 1:
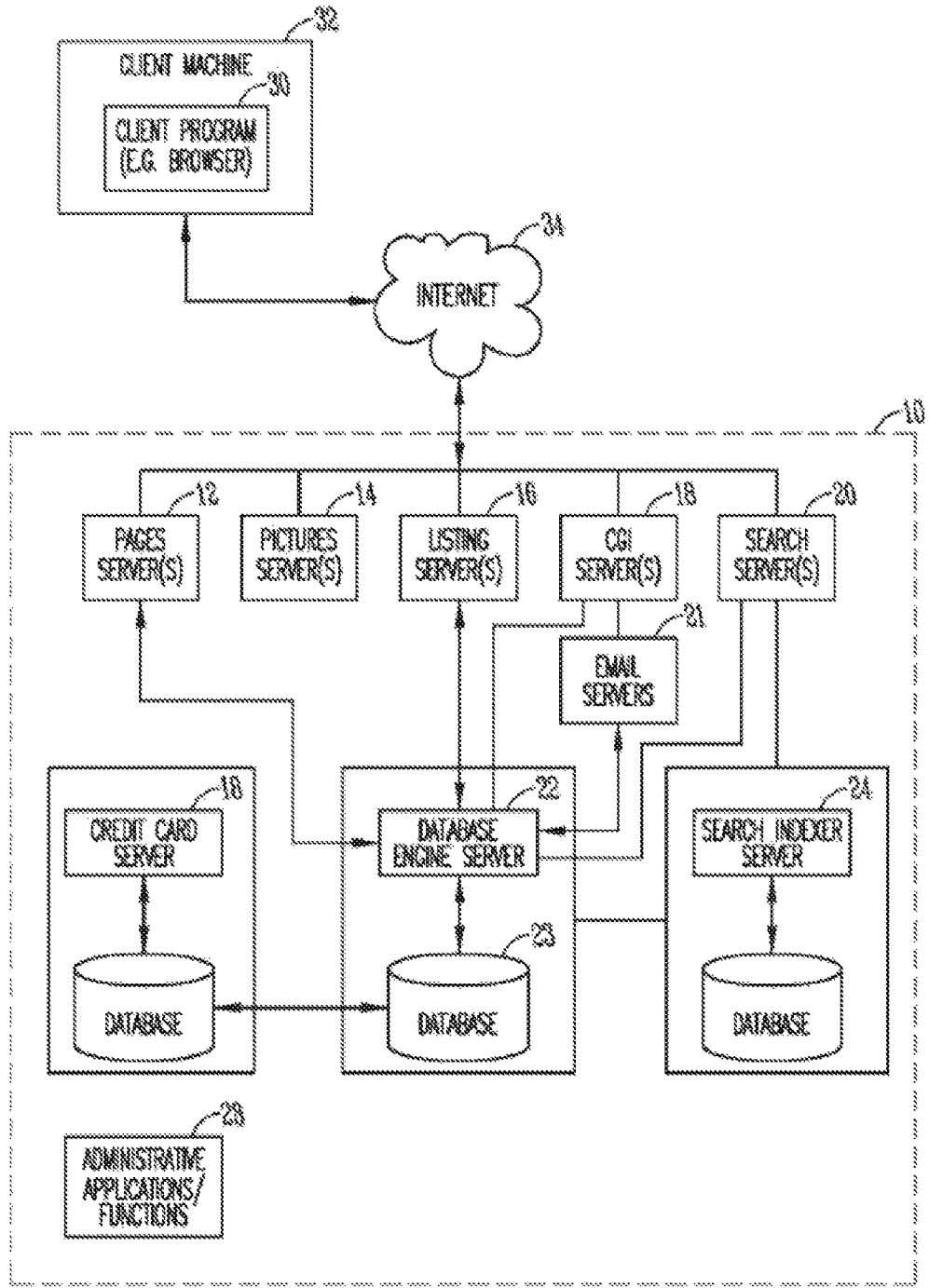
FIG. 1 is a block diagram of a network environment including a network-connected client system and server system, with which an embodiment of the invention might be implemented.
Figure 2:
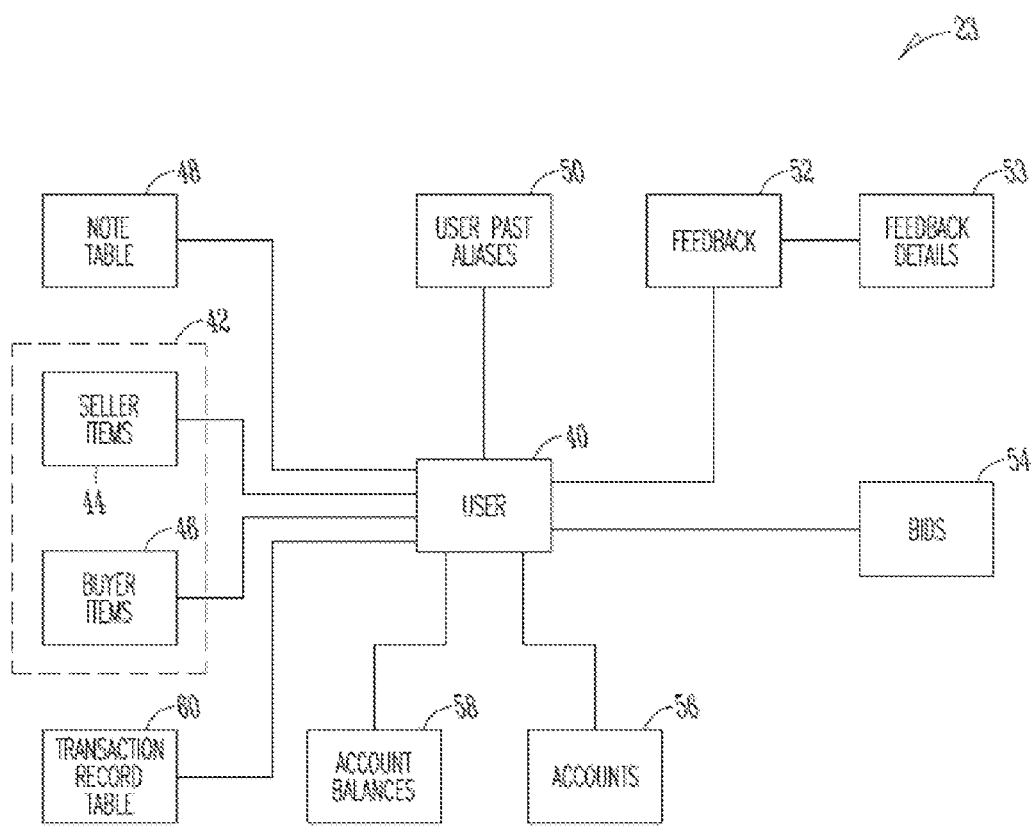
FIG. 2 illustrates is a database diagram illustrating an exemplary database for the transaction facility.

To better understand the invention, an embodiment of an electronic transaction facility is shown in FIGS. 1 and 2.

FIG. 1 is a block diagram illustrating an exemplary network-based transaction facility in the form of an Internet-based transaction facility 10. While an exemplary embodiment of the present invention is described within the context of an transaction facility, it will be appreciated by those skilled in the art that the invention will find application in many different types of computer-based, and network-based, commerce facilities. It will also be appreciated by those skilled in the art that the invention may be used in transaction facilities of other architectures. The instructions stored in the transaction facility (which can be executed by a processor) can be stored on a machine-readable medium including, but not limited to read only memory (ROM), random access memory (RAM), magnetic disk storage media, optical storage media, flash memory devices, or electrical, optical, acoustical or other form of propagated signals.

The transaction facility 10 within which an embodiment can be implemented includes one or more of a number of types of front-end servers, namely page servers 12 that deliver web pages (e.g., markup language documents), picture servers 14 that dynamically deliver images to be displayed within Web pages, listing, servers 16, CGI servers 18 that provide an intelligent interface to the back-end of transaction facility 10, and search servers 20 that handle search requests to the transaction facility 10. E-mail servers 21 provide, inter alia, automated e-mail communications to users of the transaction facility 10.

The back-end servers include a database engine server 22, a search index server 24 and a credit card database server 26, each of which maintains and facilitates access to a respective database.

An on-line trading application may form a part of database engine server 22 discussed below. The on-line trading application may include an on-line trading module and an item listing presentation management module, and is associated with database 23.

The Internet-based transaction facility 10 may be accessed by a client program 30, such as a browser (e.g., the INTERNET EXPLORER® distributed by MICROSOFT® Corp. of Redmond Wash.) that executes on a client machine 32 and accesses the transaction facility 10 via a network such as, for example, the Internet 34. Other examples of networks that a client may utilize to access the transaction facility 10 include a wide area network (WAN), a local area network (LAN), a wireless network (e.g. a cellular network), or the Plain Old Telephone Service (POTS) (or PSTN) network.

Database Structure

FIG. 2 is a database diagram illustrating an exemplary database 23, maintained by and accessed via the database engine server 22, which at least partially implements and supports the transaction facility 10. The database 23 may, in one embodiment, be implemented as a relational database, and includes a number of tables having entries, or records, that are linked by indices and keys. In an alternative embodiment, the database 23 may be implemented as a collection of blocks in a block-oriented database. While FIG. 2 shows one embodiment of a database, it will be appreciated by those skilled in the art that the invention can be used with other database structures.

Central to the database 23 is a user table 40, which contains a record for each user of the transaction facility 10. A user may operate as a seller, buyer, or both, within transaction facility 10. The database 23 also includes item tables 42 that may be linked to the user table 40. Specifically, the item tables 42 include a seller items table 44 and a buyer items table 46. A user record in the user table 40 may be linked to multiple items that are being, or have been auctioned or otherwise marketed via the transaction facility 10. A link indicates whether the user is a seller or a buyer with respect to items for which records exist within the items tables 42. While offerings by the seller are referred to as "items" in the specification, "items" includes any product or service offered by the seller. The database 23 also includes a note table 48 populated with note records that may be linked to one or more item records within the item tables 42 and/or to one or more user records within the user table 40. Each note record within the note table 48 may include, inter alia, a comment, description, history or other information pertaining to an item being auctioned or otherwise sold via the transaction facility 10 or to a user of the transaction facility 10.

A number of other tables are also shown to be linked to the user table 40, namely a user past aliases table 50, a feedback table 52, a bids table 54, an accounts table 56, and an account balances table 58.

The on-line trading system includes a user interface which may include the browser 30 whereby a user can enter select a search term describing an item the user is interested in seeing for possible purchase. The buyer selects a category preference from a category list. The buyer then transmits the category preference to the publication system, via the Internet. Usually a buyer would like to browse a category of images, for example hand bags, by style and/or brand so that the buyer can quickly find something interesting to the buyer. The buyer selects one of the choices for the desired item and images of one or more of the item selected from the choices are returned for the buyer to see for possible purchase. For instance, a number of product category can be presented via the user interface by name, such as shoes, handbags, clothes, and the like. If the category of item the user desires is a handbag, the handbag selection presented to the buyer in textual form by the user interface might be the words "clutch," "evening bag," "messenger style," and "satchel," among others. It could occur that the user might confuse, as one example, "clutch" with "evening bag" and enter "clutch" as the style of bag desired when the user is actually looking for an evening bag. This would result in one or more images of a clutch being returned to the user, when the user actually wanted one or more images of an evening bag image to be returned. Thus the item image being returned to the user that is not the actual style of item the user desires, and the user's experience is therefore less than optimum. This in itself may result in the transaction not being executed.

Figure 6A:
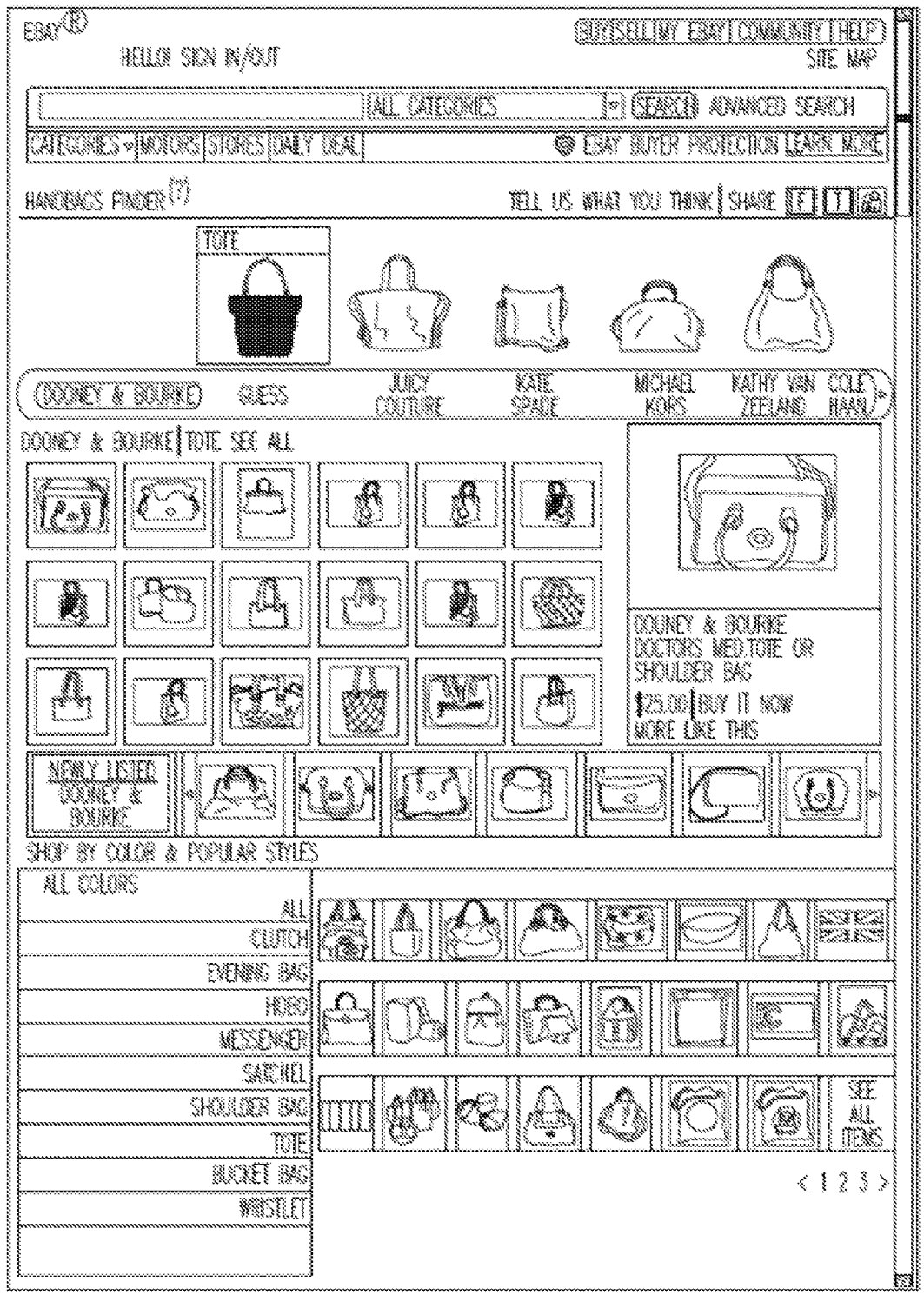
FIGS. 6A-6D illustrate an example of a method of displaying images of item listings, for still another brand of product.
Figure 6B:
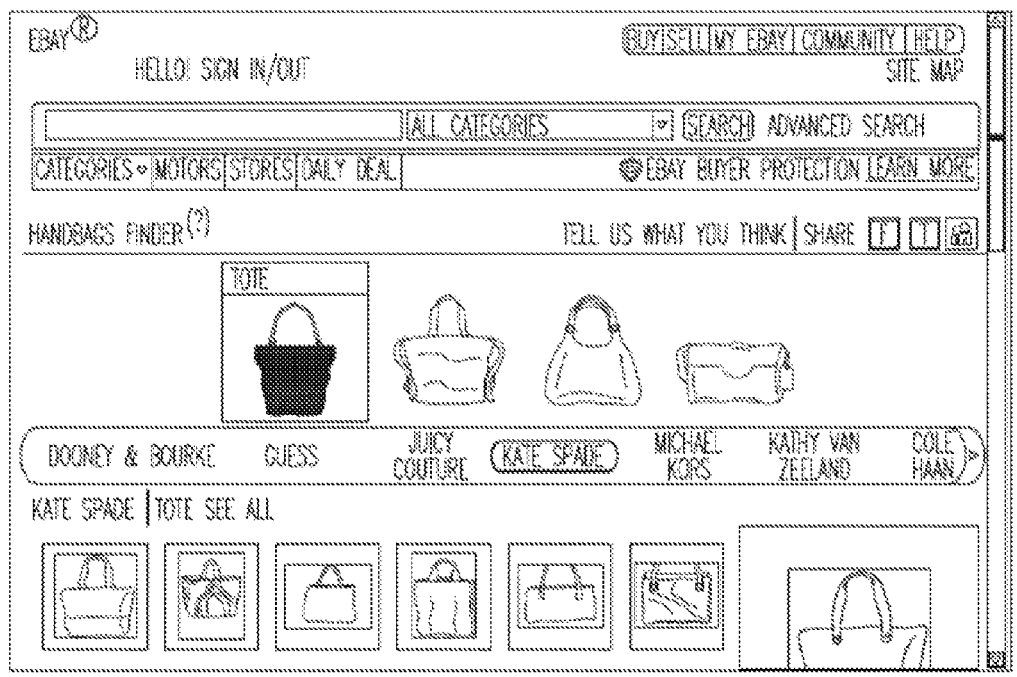
Figure 6C:
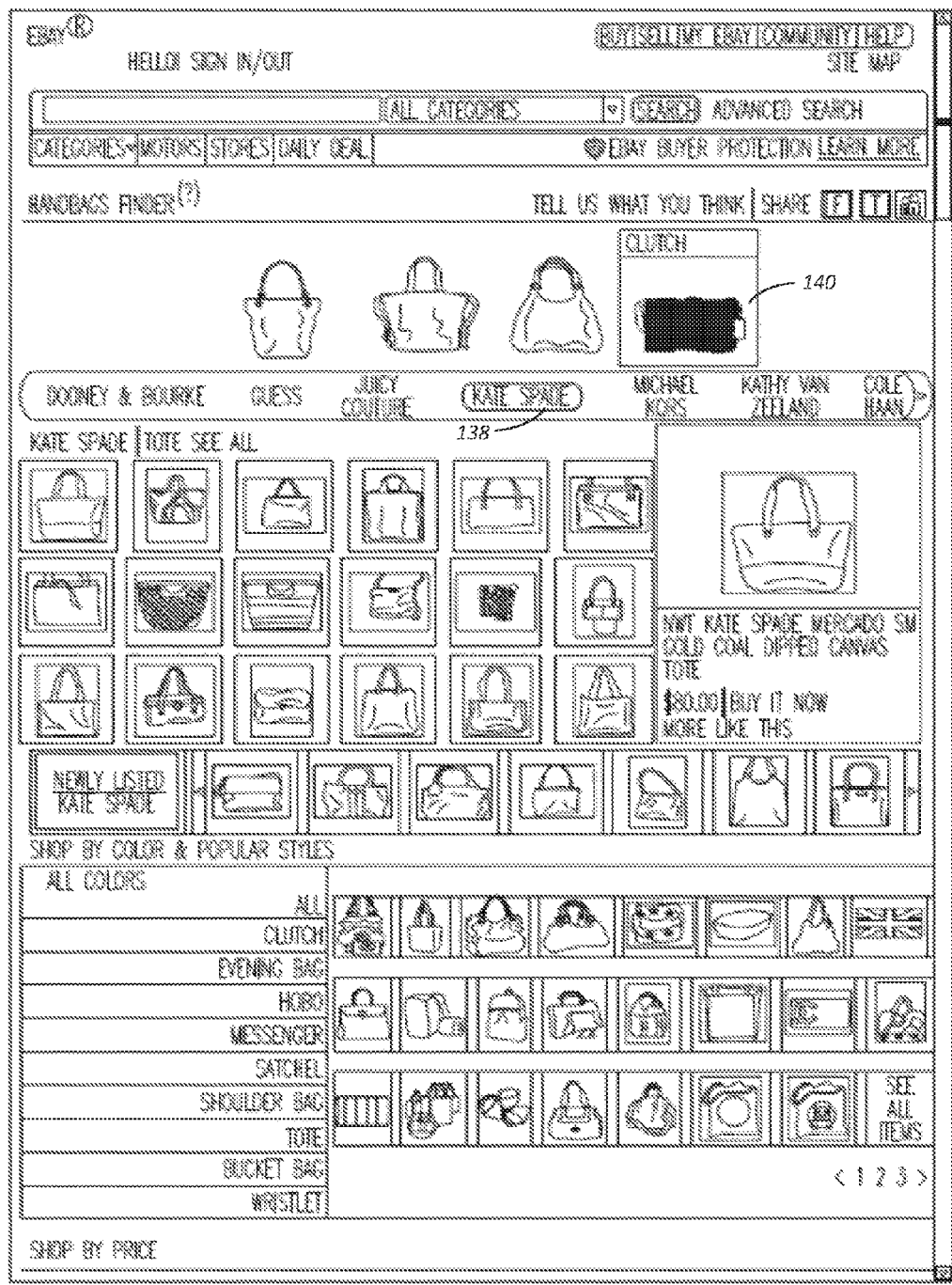
Figure 6D:
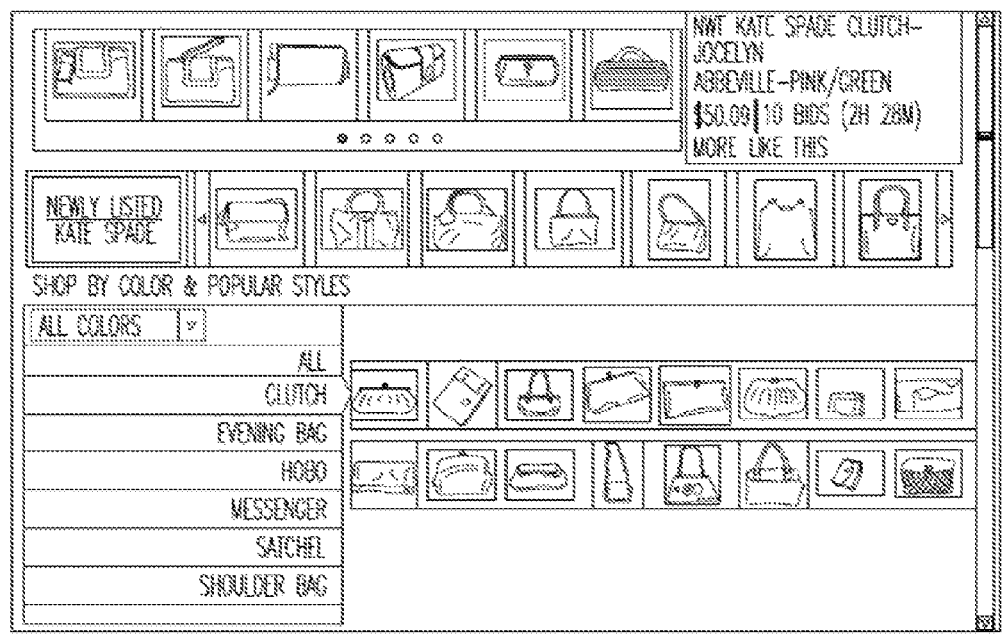

If, on the other hand, the selection presented to the user is in visual form, such as a silhouette of the product, then there is much less room for error. The user will see an image of the category of handbag. Using the example next above, the user would see images of styles such as "clutch 140," "evening bag," "messenger style," and "satchel" as in FIG. 6C. This could be, for example, presented by brand such as KATE SPADE at 138. The user could then, as only one example of an embodiment, mouseover each image to display the name of each of the various styles of handbag offered for each image. Mouseover is a well known function and an example, taken from Wikipedia, is seen in the appendix to this specification. The user could then click on the bag of the user's choice to view possible attributes of the bag such as styling, color and fabric, among others. Since the buyer will see images of the style of bag desired, with very little opportunity for error, the experience is more nearly optimum, and a transaction is more likely to be executed. This can be implemented, in one embodiment, by the images of styles of handbags being presented to the user in silhouette so that the users could, for example, mouseover the silhouette image that is most like the style of bag desired and the title of the bag would be presented. For example, the user interface can present the prospective buyer with silhouettes of a clutch, an evening bag, a messenger style bag, and a satchel, among others. Seeing the silhouette images, the buyer can mouseover them for the name and simply select the silhouette of the style of bag desired, for example an evening bag, and the system displays the styles of evening bags offered for sale. One of ordinary skill in the art will see that the displaying the title is not necessary for the invention. The user might just select the silhouette based on recognizing the silhouette. In this manner in which a buyer can find products or services which they wish to purchase. An example of general ways for a buyer to find products is seen in U.S. patent application Ser. No. 11/618,503 filed on Dec. 29, 2006, and incorporated herein by reference in its entirety.

In response to the selection, information, including images and attributes of the selected silhouette can then be returned to the user interface for the user. In one embodiment this is accomplished by the system mapping the selected evening bag image information of this example to a textual value and making a query to the transaction facility 10 which will undertake a search using the query and will then obtain and return the foregoing image and attributes. In another embodiment, attributes of the images can be returned separately for presentation to the user by way of the user interface. The presentation of a silhouette of a category of product to the buyer, since it is visual, drastically reduces the opportunity for error, or error rate, makes the buyer's experience more nearly optimum, and is more likely to result in an executed transaction.

As another example, if the buyer is interested in women's shoes, various style of women's shoes will be presented in silhouette, such as high heels, pumps, flats, sandals, and the like. The user mouses over the silhouettes, again to display the name,—as only one example, and clicks to select the style of shoe of interest from the silhouettes, for example, high heels. High heel shoes of various styles and attributes can be returned to the buyer for possible purchase, much the same way handbags were returned in the above example. The various types of heels could be three-inch heels stilettos, Cuban heels, and the like. Attributes could be fabric, color, size, price and availability, among others can be displayed for the user.

In some embodiments, a user operates a web browser application 30 on a client machine 32 to interact with the transaction facility 10. A user may be presented with a search interface on client browser 30, with items in silhouette, as described generally above, and in more detail below, from which the user can select an item to be used in generating a search request submitted to the transaction facility. In some embodiments users themselves may be able to select certain item attributes. For example, the buyer may be interested in women's shoes. Certain styles of women's shoes are provided to the user interface in visual representation as silhouettes. The buyer selects a style of shoe in silhouette, and, as a result, shoes of that style, with certain attributes, such as the color, fabric, size, price, and the like, will be returned for the user to see and possibly purchase. This can be implemented by the transaction facility 10, after receiving and processing the search request, communicating a response to the web browser application 30. The response could be obtained from a system of the type seen in the above-referenced U.S. patent application Ser. No. 11/618, 503 filed on Dec. 29, 2006 that was incorporated herein by reference in its entirety. The response could be, for example, an Internet document or web page that, when rendered by the browser application 30, displays a search results page showing one or more item listings, possibly with attributes, that satisfy the user's search request. The item listings are, in some embodiments, presented by a presentation module, which may be a web server or an application server.

In some embodiments, the search engine module, not shown but of a type well known in the industry could provide the actual search function. For instance, the search engine module, in some embodiments, receives and processes a search request to identify the item listings that satisfy the search request. It will be appreciated by those skilled in the art that a variety of search techniques might be implemented to identify item listings that satisfy a search request. In general, however, the item attributes of item listings are analyzed for the presence of the user-provided search terms. For instance, in some embodiments, selected silhouettes can be converted to textual information and used to query system storage.

In an alternative embodiment, the search engine module may represent an interface to a search engine implemented as an external component or module, for example, as part of transaction facility 10, or as a separate external module. In such a scenario, the search engine module 48 may simply receive the set of item listings that satisfy a search query.

Figure 3A:
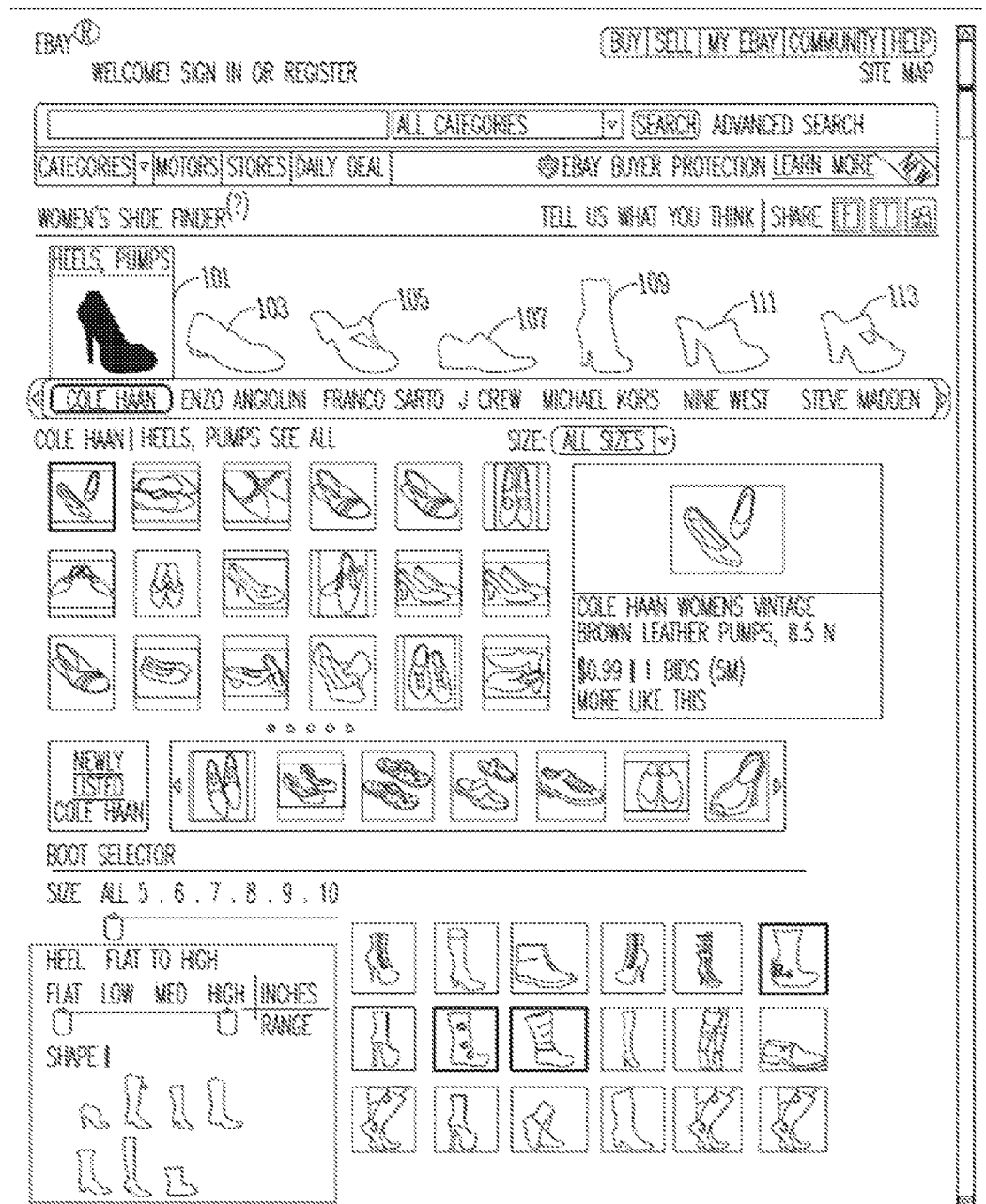
FIGS. 3A-3F illustrate an example of a method for buyer and displaying images of item listings in a user interface for one brand of product.
Figure 3B:
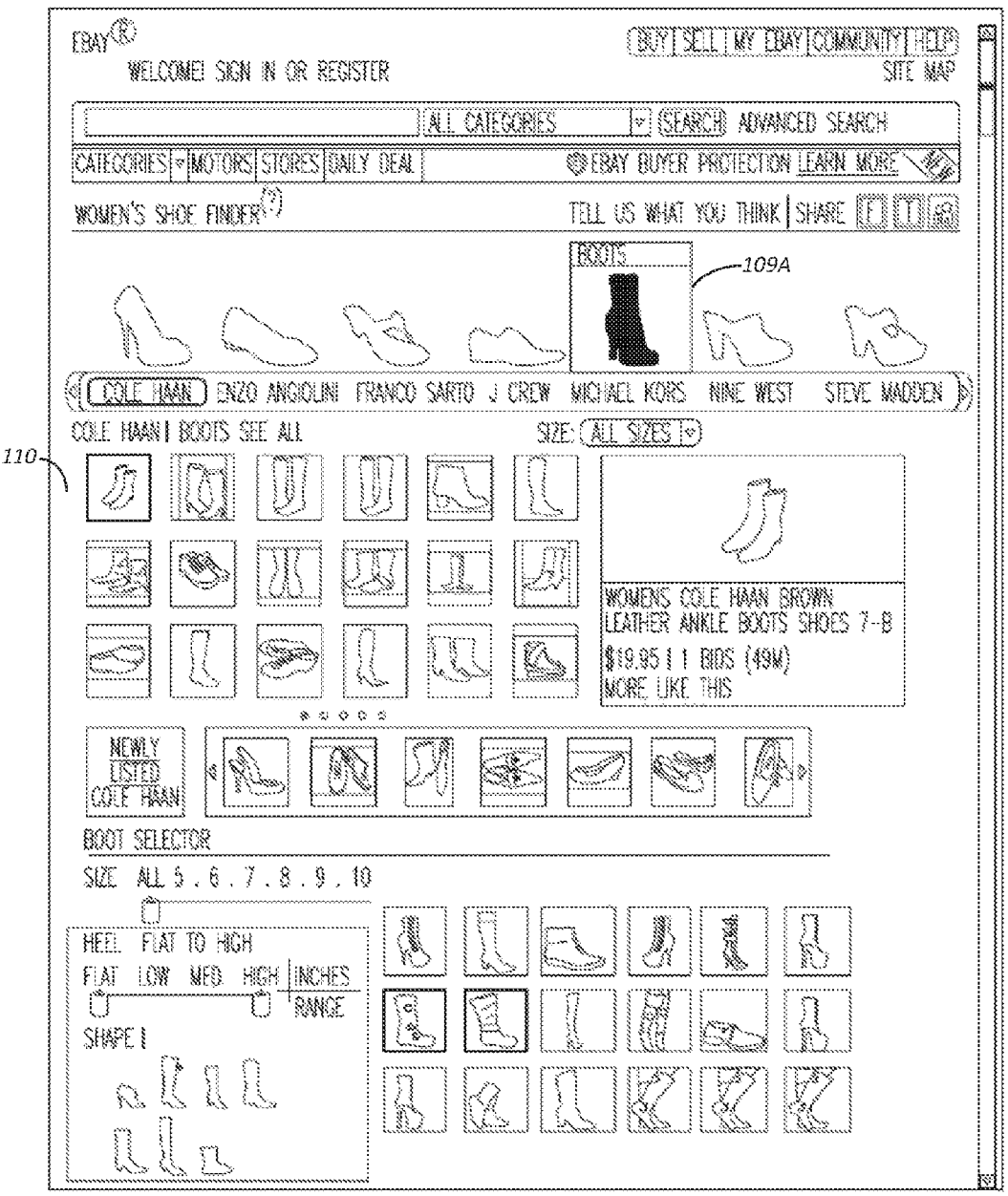

Turning now to FIG. 3A there is shown one embodiment in which a screen is presented to a prospective buyer, for example at the user interface 30 of client machine 32 on FIG. 1. The screen in FIG. 3A shows style of shoes in silhouette form. A particular brand and style might be used as a default brand and style as one example for beginning the process. In this case the default brand is Cole Haan and the default style of shoe is Heels and Pumps. Those of ordinary skill in the art will recognize that a default style need not be used, but that other ways of beginning the process can be used. In silhouette form across the top of page are the various other styles of shows offered by Cole Haan—heels and pumps 101, flats 103, sandals 105, loafers 107, boots 109, clogs 111, and platform heels 113. By mousing over each of these a selection indicator such as, in one embodiment, turning the silhouette blue, can give the user the name of the style of shoe. The user has the opportunity of selecting the shoe style illustrated by that silhouette. Clicking on the silhouette will then show all shoes of that style offered by Cole Haan. For example, clicking on one of these types, say boots 109 would show the styles of boots offered by Cole Haan. This is seen in FIG. 3B at 109A. These images are, in one embodiment, retrieved from system storage by mapping the selected silhouette information to textual information to be used as, or as part of, a query for the storage. An example of mapping the image information to textual for forming a query is seen below. Any of the "See All" shoes 110 in FIG. 3B can be clicked on and purchased. Examples of purchasing, and seeing attributes, such as size, material, price, and the like, are seen below.

Figure 3C:
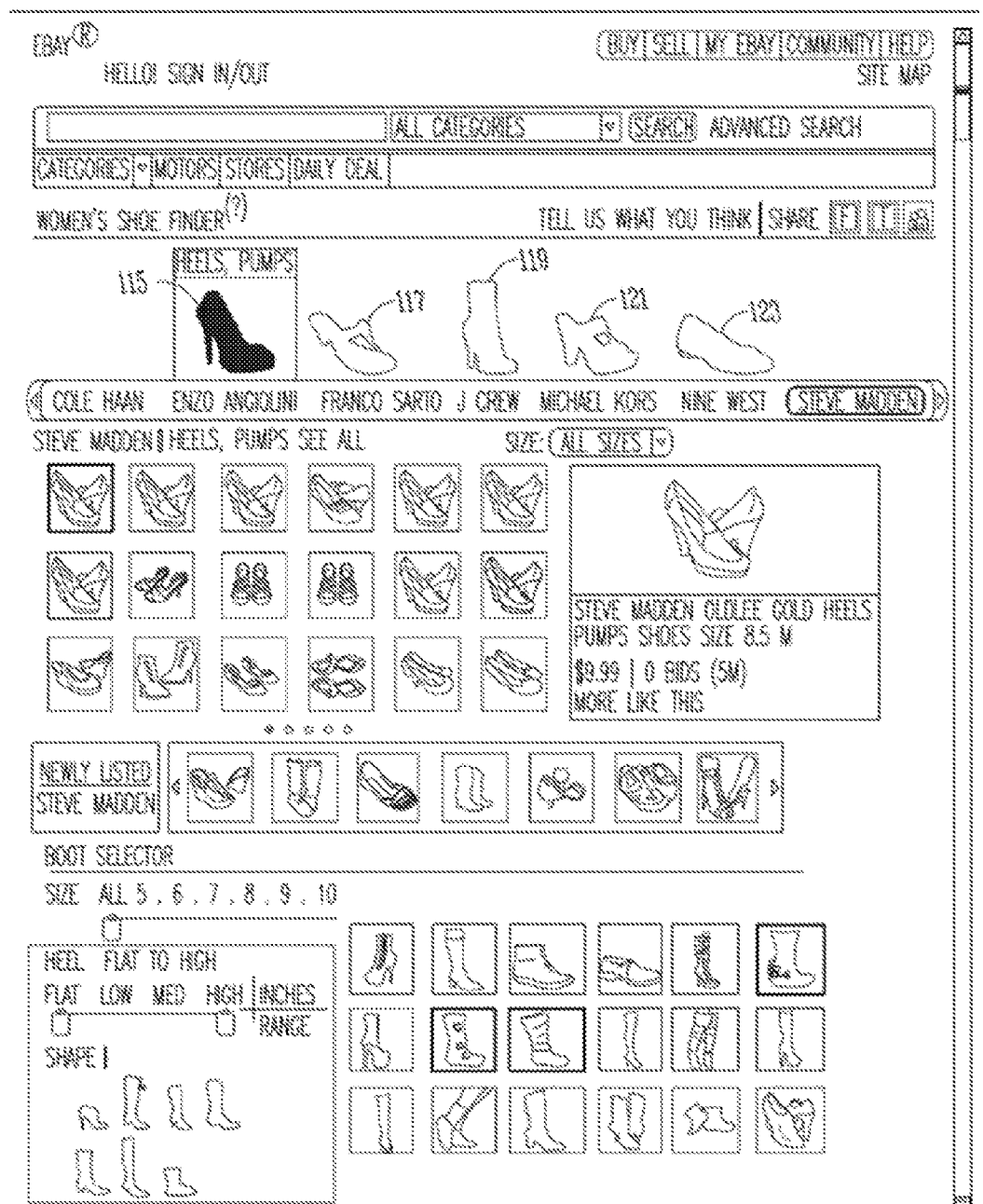
Figure 3D:
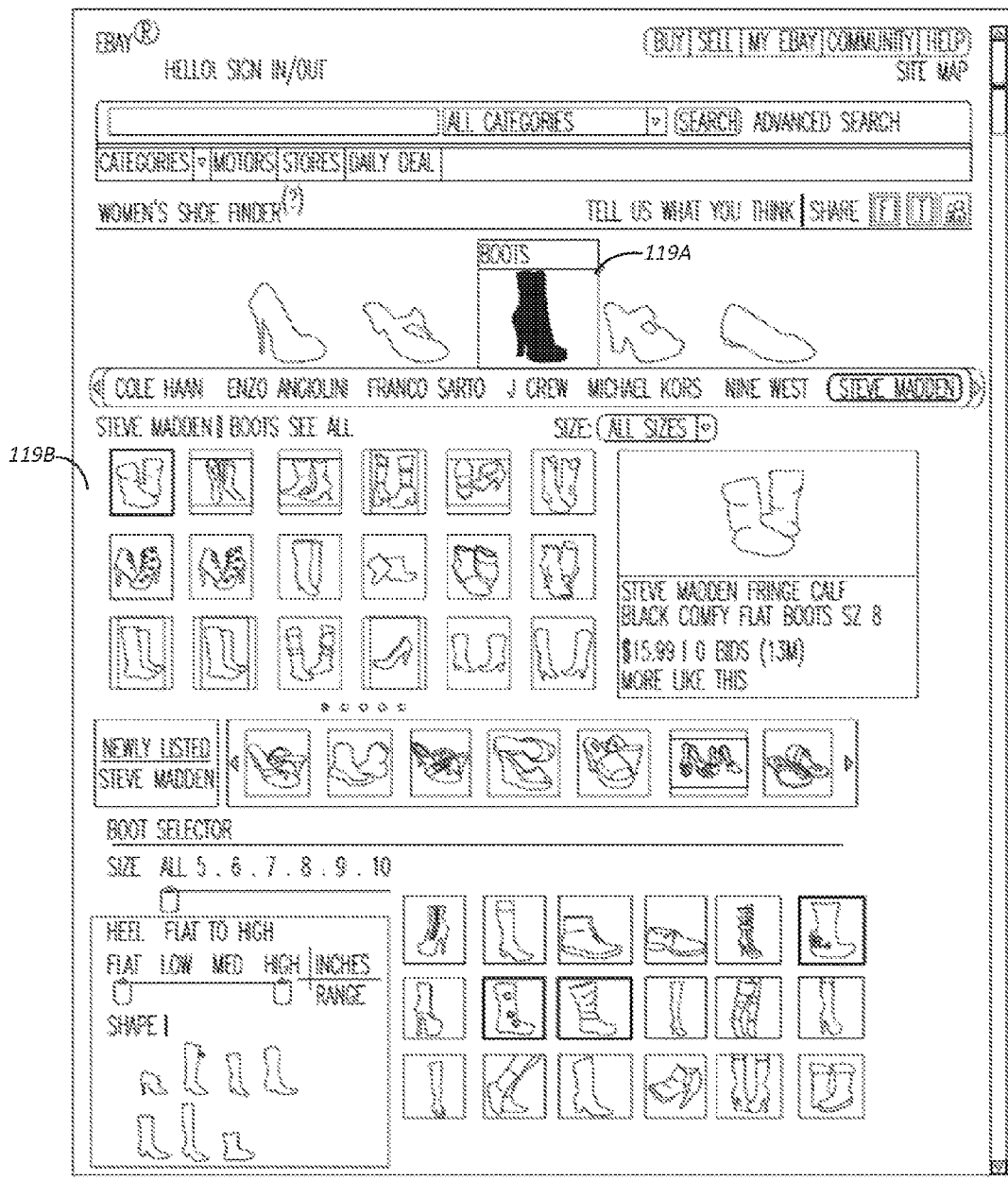
Figure 3E:
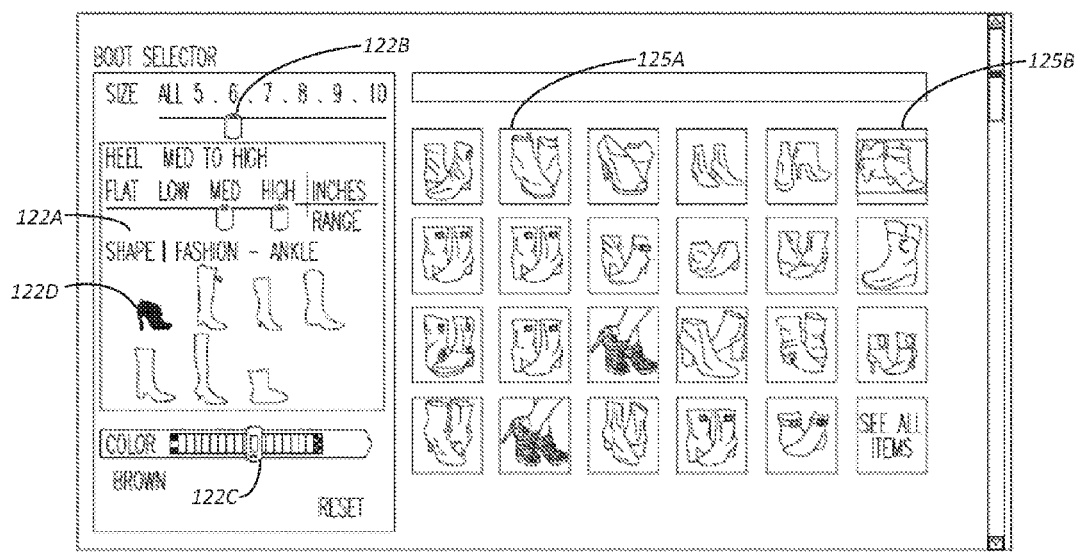
Figure 3F:
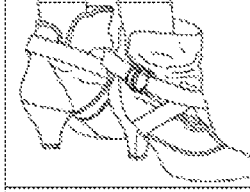

As seen in the FIGS. 3A and 3B, there are other brands offered. Clicking on other brands would operate likewise. For example, clicking on Steve Madden in FIG. 3C shows in silhouette form the styles of shoes offered by that brand—heel, pumps 115, sandals 117, boots 119, platforms 121, and Hats 123. Mousing over each of these silhouettes can cause, in this embodiment, the silhouette to turn blue in color and to list the style of shoe in words, for ease of viewing and understanding, ready for selection. As mentioned above, while this color change and listing in words is used in this embodiment, it is not necessary for the practice of the invention. Other ways of providing this function are within the knowledge of one of ordinary skill in the art without departing from the spirit or the scope of the invention. Then the appropriate silhouette is selected, for example, boots 119, and the system returns images of the boots offered by the Steve Madden brand as at 119B in FIG. 3D, where 119A illustrates that Steve Madden Boots have been selected. Clicking then on an image of a desired boot can show attributes such as size, color, and the like, according to the designer's choice and implemented as is known in the art. An improved way of doing this is seen in FIG. 3E where the screen can also show silhouettes of boot styles such as ankle, knee-high, mid-calf, cowboy/western, classics, thigh/high, and snow/winter seen generally at 122A. Selecting, for example, size, as at 122B, color, as at 122C, heel type, as at 122D, and the desired silhouette would show as an image of the boots offered for sale in that size, color, and heel type as at 125A. One could then click on one of the desired style of boots, such as at 125B, and obtain other sales information of interest including attributes such as size, price, color, material, and the like, as seen at 1250 in FIG. 3F. In each case, selection of an image could cause the image data to be converted to textual data that can be used for, or as part of, the query to system storage to retrieve the information viewed by the user. A purchase or bid can then be made if desired and the purchase registered, or recorded, by the transaction facility.

Figure 4A:
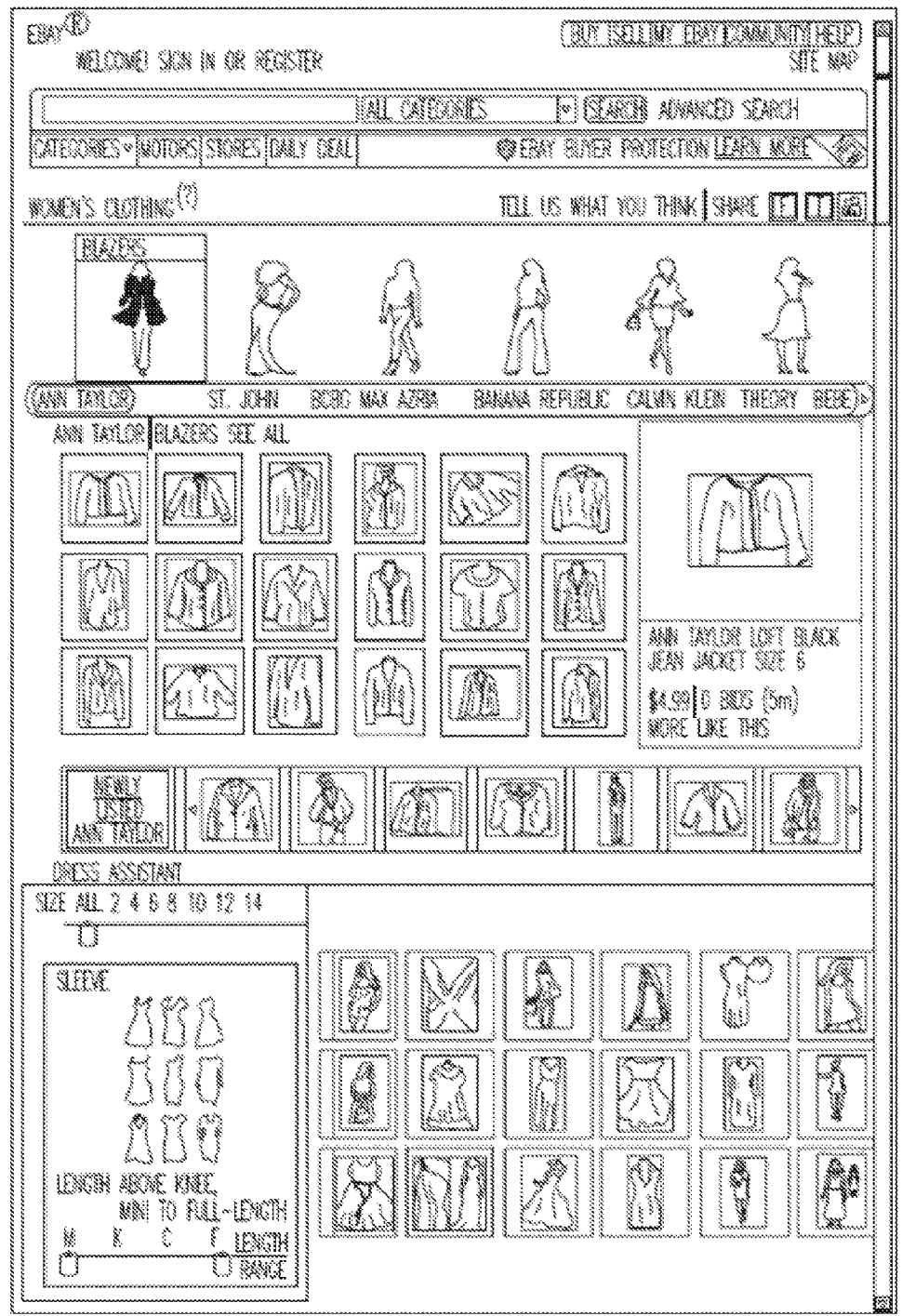
FIGS. 4A-4F illustrate an example of a method for displaying images of item listings in a user interface, for another brand of product.
Figure 4B:
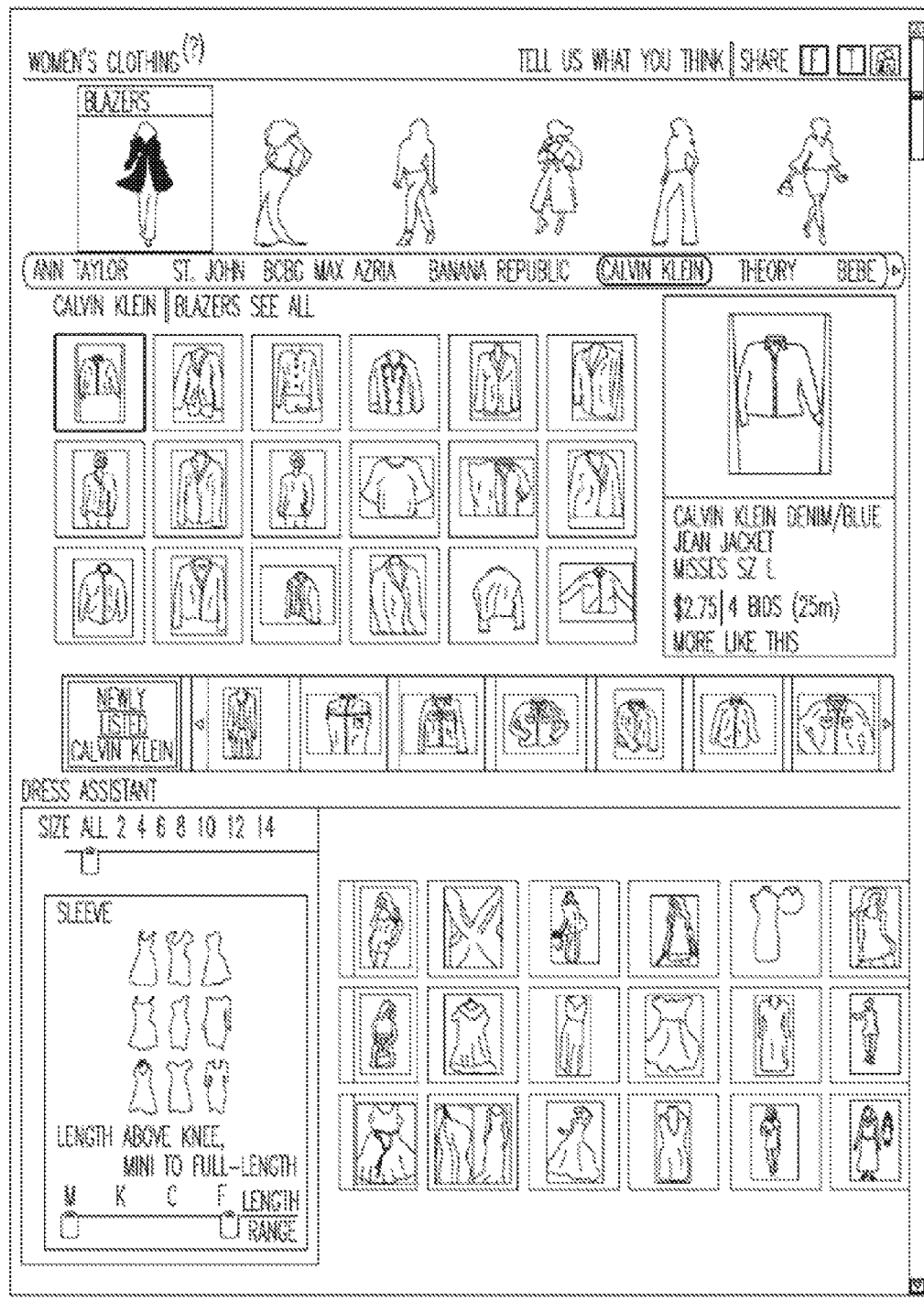
Figure 4C:
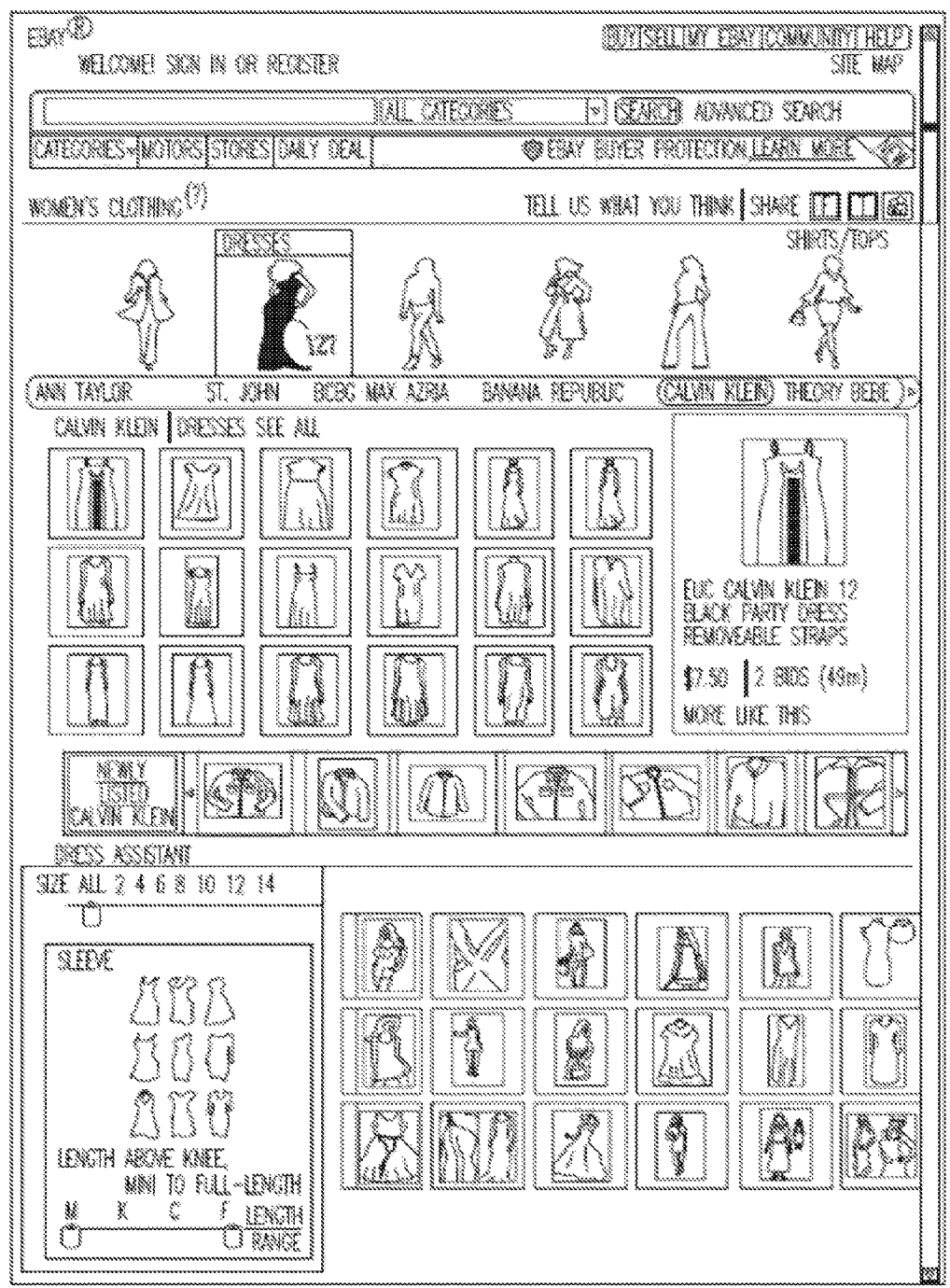
Figure 4D:
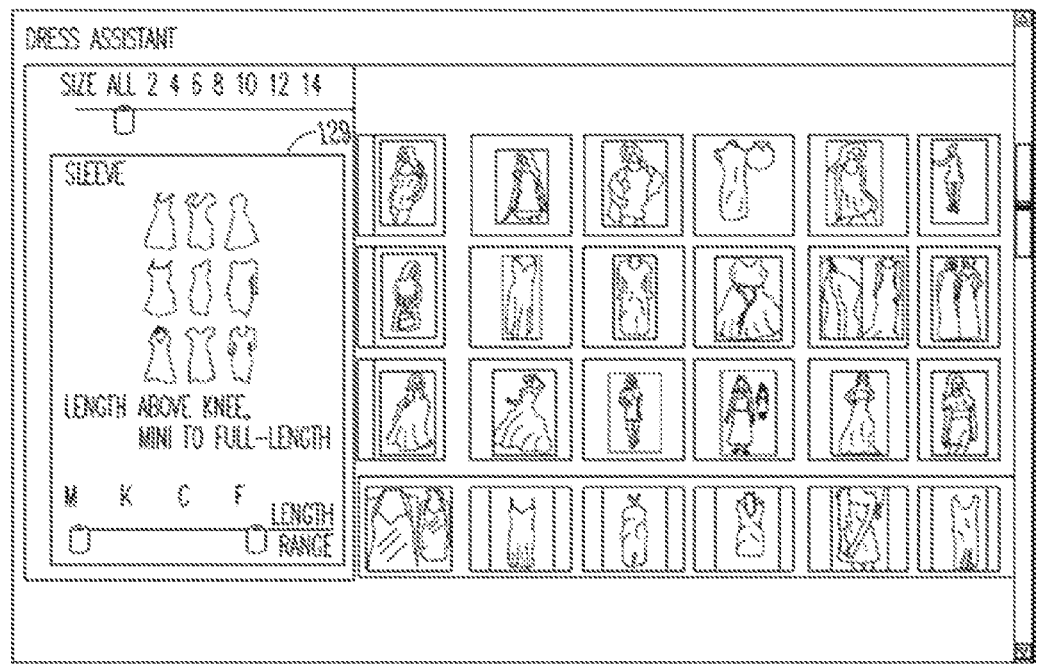
Figure 4E:
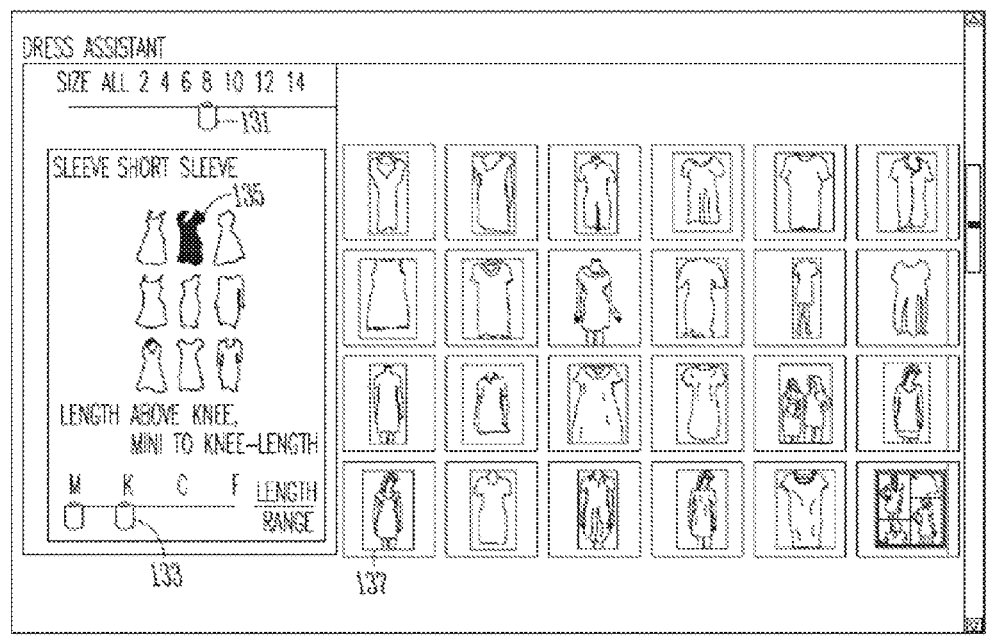
Figure 4F:

This same silhouette process can be used for other types of products, such as handbags, women's clothing, men's clothing and men's shoes, among others. The silhouette process above operates similarly for each. For example, FIG. 4A illustrates the silhouette process for an embodiment involving women's clothes. Brands are seen listed across the top such as Ann Taylor, St. John, BCBT Max Azria, Banana Republic, Calvin Klein, Theory, Bebe, and other brands. The screen can show silhouettes of women's clothing types such as blazers, dresses, jeans, pants, shirts/tops and skirts. One can select, for example, Calvin Klein and select dresses as in FIG. 4B. A category of clothing, for example, dresses 127, can be selected as in FIG. 4C, and all dresses of the type offered by the Calvin Klein brand will be displayed. Silhouettes can also be used for selecting attributes of dresses such as, for example, sleeve type, size, length, and the like. This is seen in FIG. 4D where type of dresses with different attributes—sleeveless, short sleeve, strapless, spaghetti strap, one shoulder, long sleeve, halter, cap sleeve, and ¾ sleeve are displayed as at 129. Again, if desired, title of the style of dress can be seen selected by mousing over the appropriate style of dress, and clicking, as one example. This is seen in FIG. 4E. One can also select size, color, length 133 and desired style in silhouette such as short sleeve 135. The resulting images of the dresses offered for sale in that size and color and dress length are then presented to the browser. One could then select one of the desired dresses such as cocktail dress 137 and obtains other sales information of interest for the cocktail dress, with the result shown in FIG. 4F. Again, a purchase or bid can be made if desired.

Figure 5A:
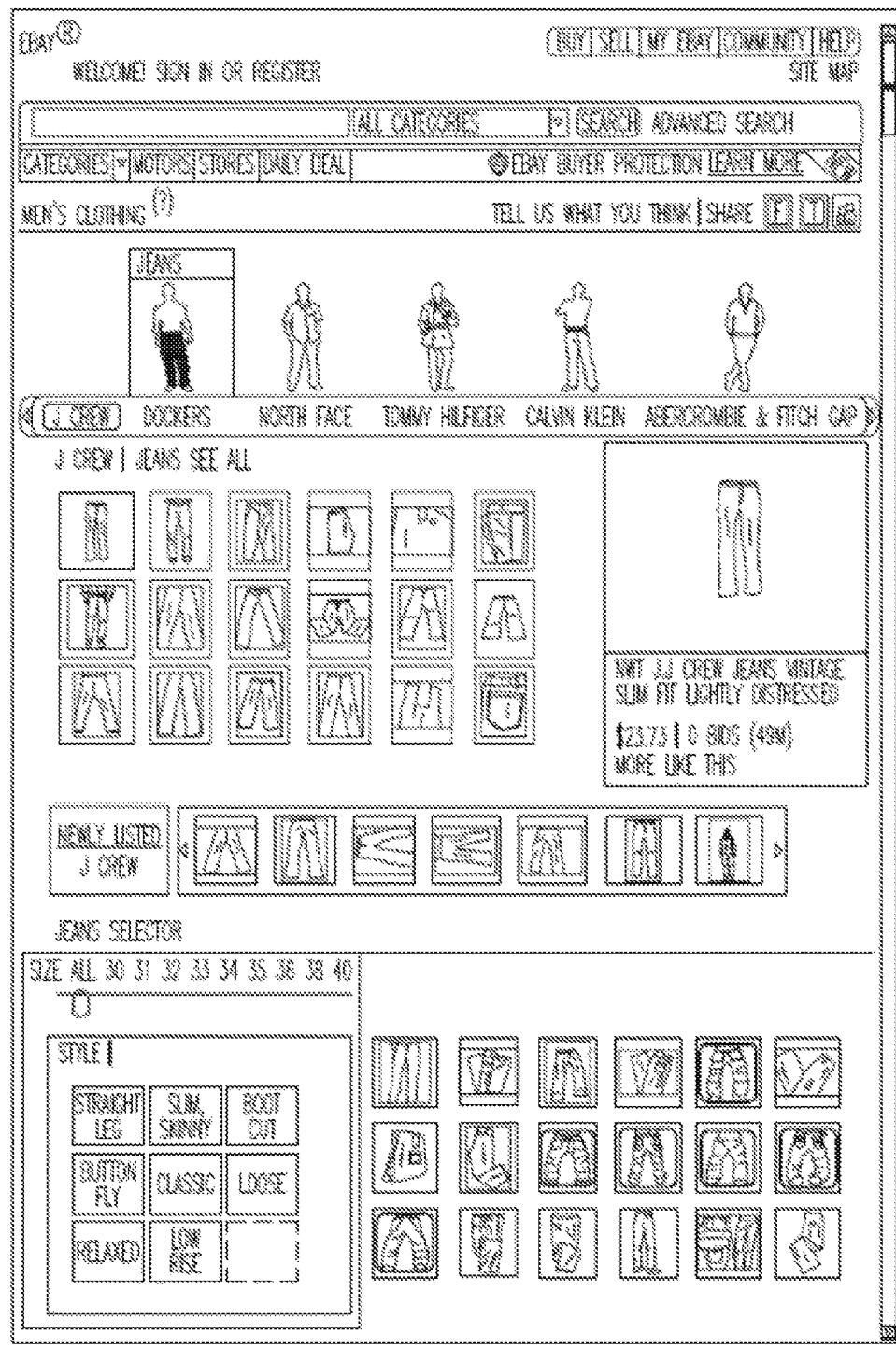
FIG. 5A-5D illustrate an example of a method for displaying images of item listings, for yet another brand of product.
Figure 5B:
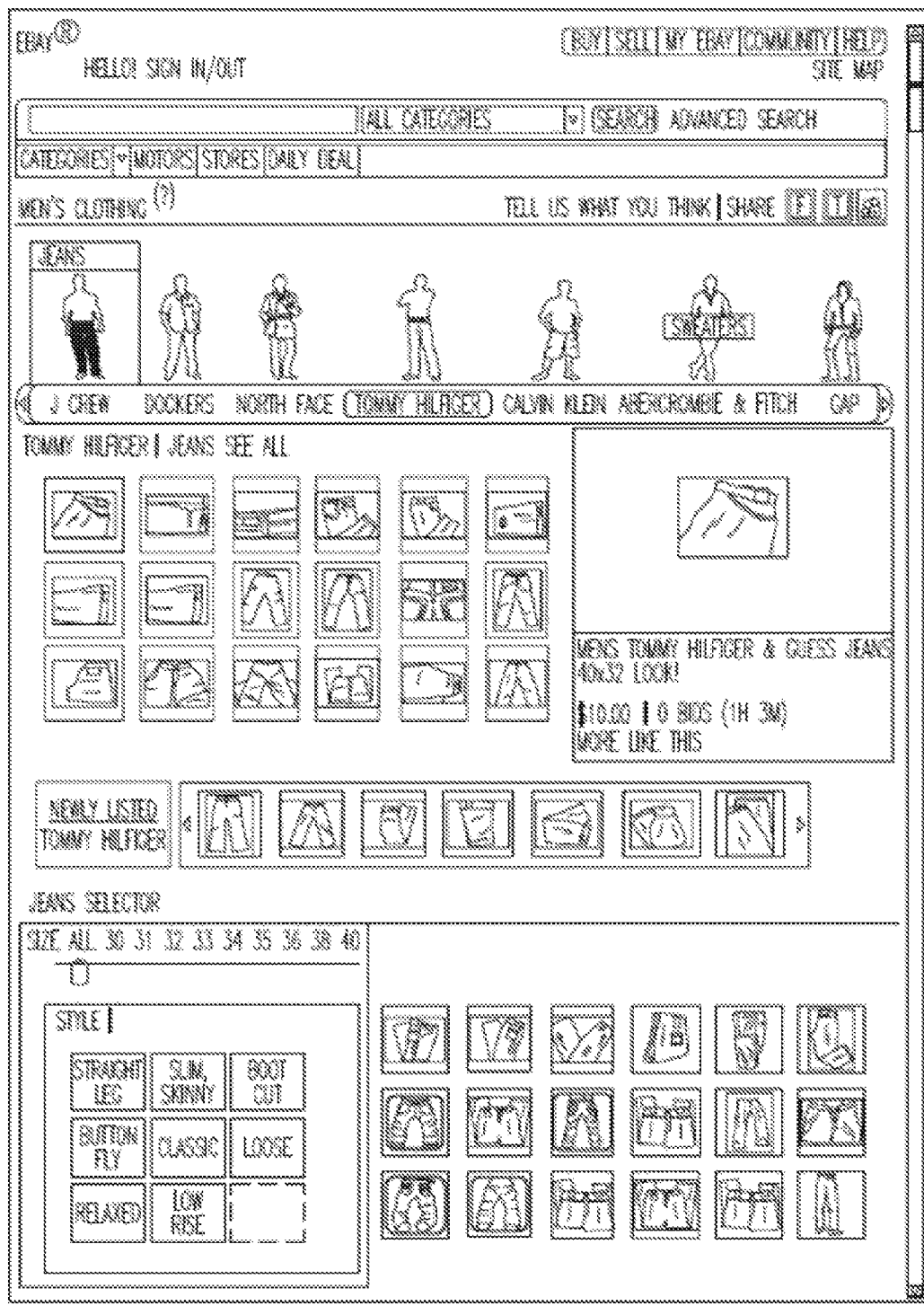
Figure 5C:
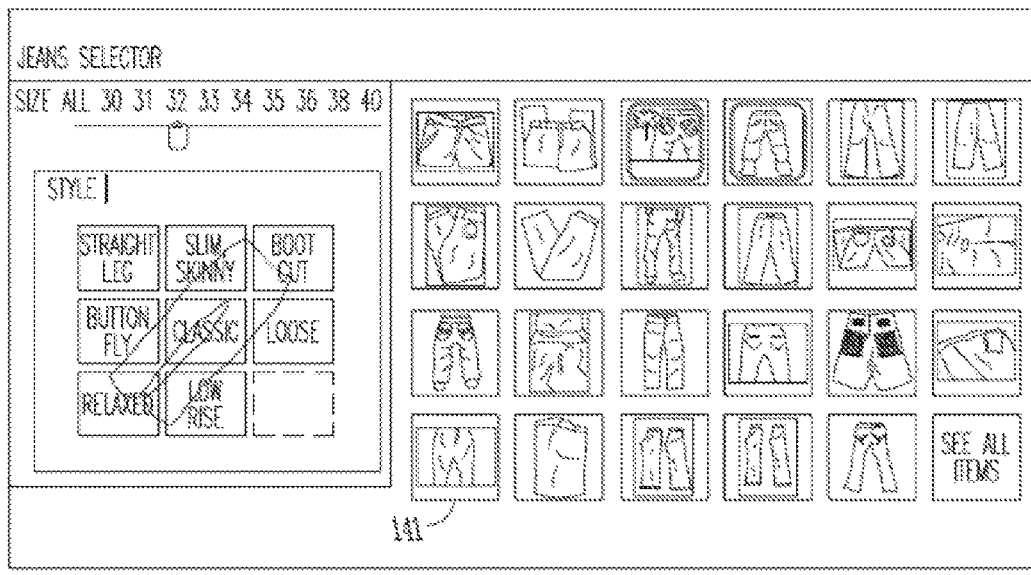
Figure 5D:
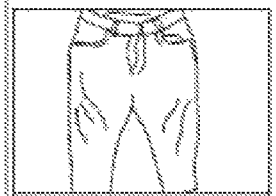

Men's clothing operates similarly, as in FIG. 5A through FIG. 5D, where men's close generally are seen in FIG. 5A. Tommy Hilfiger jeans are selected in FIG. 5B, and attributes such as style and size are returned to the user in response to the user selecting a style and size as in FIG. 5C. A particular selection such as 141 can be selected. As seen in FIG. 5D the particular style of jeans could be purchased as described in the examples above. The system functions similarly for handbags as seen in FIGS. 6A through 6D where a clutch style of handbag is selected.

Silhouettes can be generated for use in the system in several ways. For example, a silhouette of, say, a man's jacket can be generated using computer applications such as ADOBE ILLUSTRATOR™ and/or ADOBE PHOTOSHOP™. A jacket outline can be created from the photo of a man wearing a jacket. That is, the outline is traced from a photograph. A second way of obtain silhouettes is by using baseline silhouette vector images bought from I-STOCKPHOTO™ (www.istockphoto.com) and, using the above applications, modifying the image to represent the context of navigation. That is, a black silhouette vector file of a man wearing a jacket stockphoto is purchased and the jacket portion of it drawn out and painted in color to represent the jackets category. Several silhouettes representing several different categories can be created side by side in one large image called a sprite. This sprite is uploaded into the picture server in a desired format, for example as a transparent Portable Networks Graphic (PNG). The transparency aids in applying a background color using, for example, Cascading Style Sheets (CSS) as necessary to imply different states of the same image, for example, hover state, selected state. The developer could then point to each category using pixel co-ordinates as location and assigns a URL to each one to make each silhouette a link to a certain category. Hence one long image replaces the need to upload several images and multiple states of these images which in turn helps save page weight.

An example of mapping silhouette image information selected by the buyer to textual information to be used as, or as part of, a query for the system to obtain images of the style of item selected by the user. For each silhouette, there could a value associated on the web page. For example, "Thigh-high" is associated with the silhouette illustrated. This value ("Thigh-high") could be used retrieve the search parameter value (such as Fashion—Thigh-High) from a static hashmap which contains all the mappings. This could be easily modified to look-up from a Database table or any other data structure.

Hardware Operation

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Computer System

Figure 7:
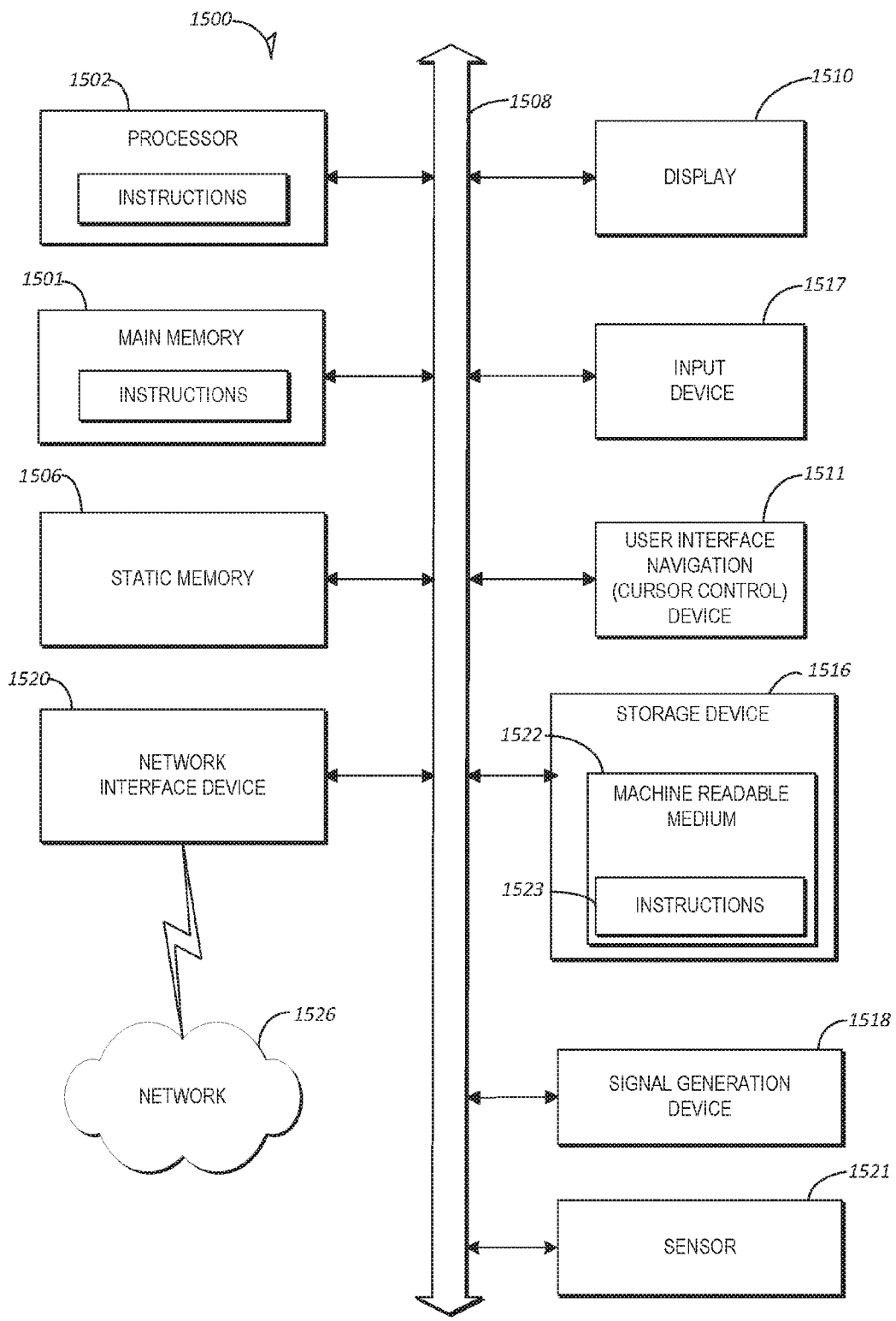
FIG. 7 is a block diagram of a machine in the form of a computing device, mobile or otherwise, within which a set of instructions, for causing the machine to perform any one or more of the methodologies discussed herein, may be executed.

FIG. 7 is a block diagram of a machine in the form of a mobile device within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software) 1523 embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

APPENDIX

A Mouseover or hover box refers to a GUI event that is raised when the user moves or "hovers" the cursor over a particular area of the GUI. The technique is particularly common in web browsers where the URL of a hyperlink can be viewed in the status bar. Site designers can easily define their own mouseover events using Javascript[1] and Cascading Style Sheets.[2] In case of multiple layers the mouseover event is triggered by the uppermost layer.

Mouseover events are not limited to web design and are commonly used in modern GUI programming. Their existence might not even be known to the user as the events can be used to call any function and might affect only the internal workings of the program.

Tooltip

A special usage of mouseover event is a tooltip showing a short description of the GUI object under the cursor. The tooltip generally appears only after the mouse is held over the object for a certain amount of time.

EXAMPLES

```
<!-- Direct usage not recommended | does not conform with web standards -->
<img    id="myImage"    src="/images/myImage.jpg" onMouseOver="alert('your message');">
// javascript without any framework
var myImg = document.getElementById('myImage');
function myMessage( ) {
    alert('your message');
}
if(myImg.addEventListener) { //addEventListener is the standard method to add events to objects
    myImg.addEventListener('mouseover', myMessage, false);
}
else if(myImg.attachEvent) { //for Internet Explorer
    myImg.attachEvent('onmouseover', myMessage);
}
else { //for other browsers
    myImg.onmouseover = myMessage;
}
// jQuery example | degrades well if javascript is disabled in client browser
$("img").mouseover(function( ) {
  alert('your message');
});
```

What is claimed is:

1. A computer implemented method for a publication system, the method comprising:

receiving, via a wireless communication channel, a query comprising a product category from a client machine;

responsive to receiving the query, presenting, via the wireless communication channel, a first interface at the client machine, the first interface displaying:
- a plurality of selectable silhouette images each representing a different product in the product category, and
- a plurality of selectable icons each representing a respective brand of the products in the product category, the plurality of selectable silhouette images and the plurality of selectable icons configured so that any combination of one of the plurality of selectable silhouette images and one of the plurality of selectable icons can be selected on the first interface by a user;

detecting selection of one of the plurality of selectable icons and selection of one of the plurality of selectable silhouette images on the first interface;

responsive to detecting selection of the one of the plurality of selectable silhouette images, mapping the selected one of the plurality of selectable silhouette images to textual information;

querying computer storage, using the textual information, in response to detecting selection of the one of the plurality of selectable icons and selection of the one of the plurality of selectable silhouette images, to identify a plurality of images of the product represented by the selected one of the plurality of selectable silhouette images and bearing the brand represented by the selected one of the plurality of selectable icons, the represented product having various attributes and listed on the publication system;

responsive to the querying, identifying in the computer storage, by a hardware processor, a plurality of images of the represented product that bears the brand, each of the plurality of images of the represented product having at least one of the various attributes;

presenting, via the wireless communication channel, a second interface at the client machine, the second interface displaying at least some of the identified images as selectable silhouette images;

detecting selection of one silhouette image of the displayed selectable silhouette images; and responsive to detecting the selection of the one silhouette image of the displayed selectable silhouette images, presenting, via the wireless communication channel, a third interface at the client machine, and displaying on the third interface a selectable listing of the selected one silhouette image for selection.

2. The method of claim 1 further comprising using a hash of the textual information for querying the computer storage.

3. The method of claim 1 further comprising presenting the selected one image as part of a product listing.

4. The method of claim 1, wherein mapping the selected one of the plurality of selectable silhouette images to textual information comprises:
- determining a value associated with the selected one of the plurality of selectable silhouette images; and
- using the value associated with the selected one of the plurality of selectable silhouette images to retrieve the textual information from a static hashmap comprising mappings between a value associated with each of the plurality of selectable silhouette images and textual information.

5. The method of claim 4, wherein the textual information comprises a search parameter value.

6. A computer-readable storage device with an executable program stored thereon, which program, when executed, instructs one or more hardware processors to perform operations comprising:
receiving, via a wireless communication channel, a query comprising a product category from a client machine;

responsive to receiving the query, presenting, via the wireless communication channel, a first interface at the client machine, the first interface displaying:
- a plurality of selectable silhouette images each representing a different product in the product category, and
- a plurality of selectable icons each representing a respective brand of the products in the product category, the plurality of selectable silhouette images and the plurality of selectable icons configured so that any combination of one of the plurality of selectable silhouette images and one of the plurality of selectable icons can be selected on the first interface by a user;

detecting selection of one of the plurality of selectable icons and selection of one of the plurality of selectable silhouette images on the first interface;

responsive to detecting selection of the one of the plurality of selectable silhouette images, mapping the selected one of the plurality of selectable silhouette images to textual information;

querying computer storage, using the textual information, in response to detecting selection of the one of the plurality of selectable icons and selection of the one of the plurality of selectable silhouette images, to identify a plurality of images of the product represented by the selected one of the plurality of selectable silhouette images and bearing the brand represented by the selected one of the plurality of selectable icons, the represented product having various attributes and listed on the publication system;

responsive to the querying, identifying in the computer storage, by a hardware processor, a plurality of images of the represented product that bears the brand, each of the plurality of images of the represented product having at least one of the various attributes;

presenting, via the wireless communication channel, a second interface at the client machine, the second interface displaying at least some of the identified images as selectable silhouette images;

detecting selection of one silhouette image of the displayed selectable silhouette images; and responsive to detecting the selection of the one silhouette image of the displayed selectable silhouette images, presenting, via the wireless communication channel, a third interface at the client machine, and displaying on the third interface a selectable listing of the selected one silhouette image for selection.

7. The computer-readable storage device of claim 6, the operations further comprising mapping the selected one image to textual information and using a hash of the textual information for querying the computer storage.

8. The computer-readable storage device of claim 6, wherein the selected one image has one attribute, the operations further comprising displaying the one attribute as part of at least one item listing.

9. The computer-readable storage device of claim 8, the operations further comprising presenting an selected one image as part of the listing.

10. The computer-readable storage device of claim 6, the operations further comprising, responsive to detecting selection of the one image, enabling purchase of the product represented by selected one image.

11. A system comprising:
at least one hardware processor configured to:
receive, from a client machine via a wireless communication channel, a query comprising a product category;
present, responsive to receipt of the query, at the client machine and via the wireless communication channel, a first interface that displays:
a plurality of selectable silhouette images that each represents a different category of product in the product category, and a plurality of selectable icons that each represents a respective brand of the styles of the product in the product category, and
the plurality of silhouette images and the plurality of selectable icons configured so that any combination of one of the plurality of selectable silhouette images and one of the plurality of selectable icons can be selected on the first interface by a user;
detect selection of one of the plurality of selectable icons and selection of one of the plurality of selectable silhouette images, on the first interface;
responsive to detecting selection of the one of the plurality of selectable silhouette images, mapping the selected one of the plurality of selectable silhouette images to textual information;
query computer storage, using the textual information, in response to the detection of the selection of one of the plurality of selectable icons and the selection of one of the plurality of silhouette images, to identify a plurality of silhouette images of the category of product represented by the selected one of the plurality of silhouette images, and bearing the brand represented by the selected one of the plurality of selectable icons, the selected one of the plurality of silhouette images having various attributes and listed on the publication system;
present, via the wireless communication channel, a second interface at the client machine, the second interface comprising a display of at least some of the identified plurality of silhouette images;
detect selection of one image of the at least some of the identified plurality of silhouette images; and
responsive to detection of selection of the one image, present, via the wireless communication channel, a third interface at the client machine, the third interface comprising a listing of the selected one image, for selection.

* * * * *

UNITED STATES PATENT AND TRADEMARK OFFICE
CERTIFICATE OF CORRECTION

PATENT NO. : 9,792,638 B2
APPLICATION NO. : 12/749467
DATED : October 17, 2017
INVENTOR(S) : Xiao Xiao Liu et al.

It is certified that error appears in the above-identified patent and that said Letters Patent is hereby corrected as shown below:

On the Title Page

In item (56), in Column 2, under "Other Publications", Line 2, delete "accesed" and insert -- accessed --, therefor.

Signed and Sealed this
Twentieth Day of February, 2018

Andrei Iancu
*Director of the United States Patent and Trademark Office*